United States Patent Office 3,520,613
Patented July 14, 1970

3,520,613
INTERFEROMETER WITH ENVIRONMENTAL CORRECTION COMPUTER
Anwar K. Chitayat, Plainview, N.Y., assignor to Optomechanisms, Inc., Plainview, N.Y.
Filed Nov. 14, 1966, Ser. No. 594,213
Int. Cl. G01b 9/02
U.S. Cl. 356—106      16 Claims

ABSTRACT OF THE DISCLOSURE

A laser interferometer having fringe counter output readout means. An inch computer is connected to the fringe counter. Environmental correction computer means are connected to inch computer and comprises part temperature responsive sensing means, barometric pressure sensing means, air temperature sensing means and means to combine the output of all said sensing means. The combined output of said sensing means is connected to modify said inch computer means.

---

This invention relates to environmental correction computer means and more particularly to such means used in connection with a measuring interferometer.

Measuring with optical interferometers for instance, with a laser light source or other stable light source, is the most accurate measuring means now possible for making measurements on machine tools and other devices requiring great accuracy.

In a typical system, the light system emits a beam which is returned by a reflector mounted on the part to be measured which is generally movable. As the movable part is moved, interference fringes are generated which are automatically counted by a reversible photocounter. In a typical system, the distance traveled is $NL/4$ where N is the number of fringes counted and L is the wavelength of the light source.

The measurements by laser systems are so accurate that they are affected by environmental factors such as air temperature, part temperature, due to the different coefficient of expansion of the material being measured, barometric pressure and humidity. The present invention provides means to measure these factors and combine them into an adjustment factor, which multiplies the count so that the measurement is compensated for the environment factors occurring during the measuring.

Accordingly, a principal object of the invention is to provided new and improved environmental correction computer means.

Another object of the invention is to provide new and improved correction computer means for interferometers.

Another object of the invention is to provide new and improved correction computer means for interferometers and means to measure and adjust for part temperature, barometric pressure, air temperature and humidity.

Another object of the invention is to provide new and improved environmental correction computer means for a measuring interferometer comprising part temperature sensing means, barometric pressure sensing means, air temperature sensing means, humidity responsive means and means to combine the outputs of all of said means to provide a combined adjustment factor to be applied to a fringe counter operated from the interferometer.

These and other objects of the invention will be apparent from the following specification and drawings of which:

Figure 1:
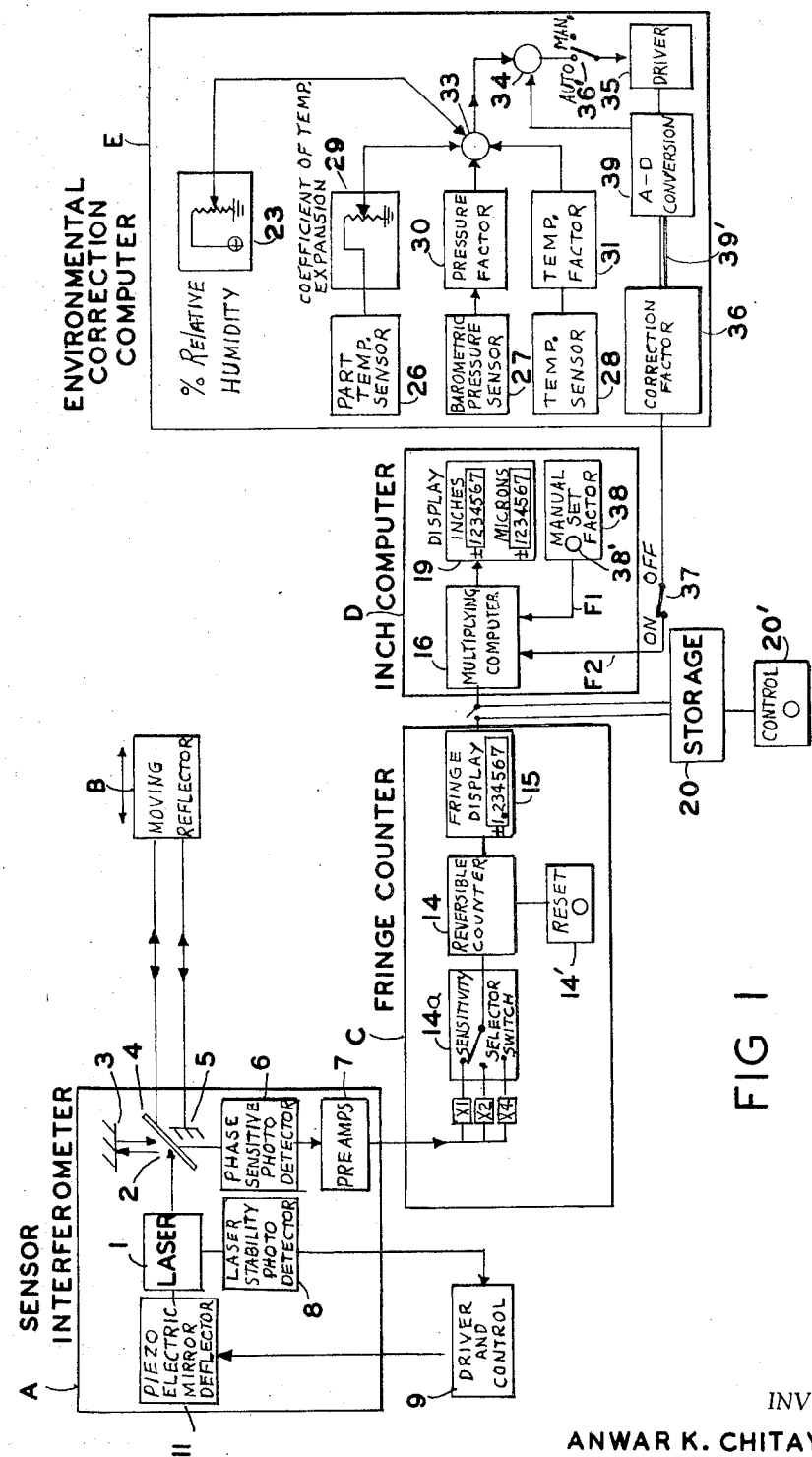
FIG. 1 is a schematic block diagram of a system embodying the invention.

Referring to FIG. 1, the sensor A is a self contained unit consisting of the laser 1 light source; the interferometer optics 2; comprising a first fixed mirror 3; a beam splitter 4; and second fixed mirror 5 to return the beam for double beam mode of operation; the phase sensitive photodetector 6 and its associated preamplifiers 7.

The laser 1 in the system is preferably provided with a conventional servo loop automatic frequency stabilization means comprising laser stability photo detector 8, driver and control means 9, connected to the output of the laser stability photo detector 8, said driver and control means 9 being connected to a piezo electric mirror deflector 11. This assures that the laser output will be maintained exactly, within one part per hundred million, at its center frequency of 6328 A., eliminating any possible error from this portion of the system. In addition, this feature reduces the required laser warmup time when starting up from an "off" condition, which is only about one third of the time required when the servo loop is not used. This provides distinct advantage in portable use, such as machine tool calibration.

The sensor A also contains highly sensitive photomultiplier detector means 6 with extremely fast frequency response to detect the fringes of the interferometer. The measuring laser beam preferably consists of two components of light which are 90 degrees out of phase. The interference fringes generated from each provide information on the direction of travel of the reflector B, including the vibration factors which can be anticipated in a machine shop measuring environment. The interference fringe pulses give the direction and amount of travel information and are amplified as necessary for use by the fringe counter C. Typical interferometer and counter means are shown in Pat. No. 3,271,676, granted Sept. 6, 1966, and assigned to the assignee of the present invention.

The value of each fringe generated by the laser dual beam interferometer represents approximately 6 millionths of an inch travel of the reflector B. The photo detector may provide one pulse per fringe. Utilizing the information obtained from the two 90 degree out-of-phase components of the laser light beam, it is also possible to divide the value of each fringe into smaller increments of measurement. This would permit the use of a sensitivity switch 14a in the fringe counter C to select either one, two or four pulses per fringe representing approximately 6, 3, or 1½ micro inches respectively. These pulses are counted by counter 14 and continuously displayed on conventional display 15 as fractions of light waves, each count having an exact value as determined by the parameters of the system. The importance of a separate fringe display is that it provides a readout of the basic element used in making the measurement. This readout can readily be used to prove out the accuracy of computer section of the system as will be explained later. Counter 14 preferably has a suitable reset means 14'.

The inch computer D consists of the multiplying computer 16, a manually settable multiplying factor input means 38 and the inch or metric display 19. The multiplying computer 16 multiples the fringe count value by the manually set multiplying factor F1, which can be the value required for either inch or metric readout, to feed the inch or metric display means 19. As shown on the block diagram, FIG. 1, the environmental correction computer E continuously varies the multiplying computer factor F1 by a factor F2 for instantaneous corrections for the various elements of ambient conditions.

It should be noted that changes in ambient conditions will affect the total laser beam light path and will thus vary the value of the total fringe count. The multiplying computer must therefore, be continuously available to apply corrections, as obtained from the environmental correction computer E to the instantaneous values of the total fringe count to obtain a corrected inch or metric readout. This is accomplished in the system in the correction computer E, which applies the environmental correction factors for instance, at a rate of over 30 times a second so that the inch readout is always computed for ambient conditions existing at the moment.

The instantaneous fringe count is preferably fed into a buffer storage means 20 to be displayed, in response to a control signal from readout control 20', on the inch or metric readout. The inch readout is independent of the fringe readout and no errors are introduced by the buffer storage operation.

The advantages of this system can be seen by comparison to another approach which uses "real time computing." In the other system each individual fringe, as it is counted, is multiplied by a factor to obtain its corrected value for the inch display. Changing the multiplying factor during the measuring period of one cycle is not practical as the change would not properly compensate for fringes already counted. The other system is, therefore, not capable of correcting for environmental changes which take place after measuring process has been started. It can be shown that uncompensated changes in temperature of only 2° F. in the airpath of the laser beam will reduce accuracy by approximately 1 part per million, or 100 microinches on a 100 inch measurement. The present system, therefore, has a marked advantage in being able to continuously correct starting from the zero point of the measurement.

The environmental correction computer E provides the previously discussed continuous correction factors for changes in ambient conditions. This computer accepts sensor inputs as is shown on FIG. 1, the block diagram, and provides a correction factor for changes which is applied to the inch or metric display by means of the multiplying computer 16. Each factor can preferably be switched in or out of the system as desired. The correction factor being applied by each sensor can be preferably observed on a readout and checked against actual ambient conditions. The total observed correction factors can then be applied, using an office calculating machine, to the fringe count, as displayed to check against the automatically corrected inch or metric readout to verify computer accuracy. This again emphasizes the importance of the fringe count display as the basic reference in proving system accuracy.

Referring to FIG. 1, the environmental computer E generally comprises the following input means; the percent relative humidity input means 23, which may manually be set since this correction is small, the part temperature sensor 26, barometric pressure sensor 27 and air temperature sensor 28.

The output of the part temperature sensor 26 is fed to an adjustment circuit 29 for inserting the coefficient of temeperature expansion of the part. The barometric pressure sensor 27 is fed to a pressure factor circuit 30 which may be a multiplier. The air temperature sensor 28 input is fed to a temperature factor means 31 which may be a multiplier.

The four factors as modified are connected to an operational amplifier means 33, the output of which is the total error due to the environmental conditions. This output is fed to an analogue to digital conversion means 39 which preferably incorporates a feed back servo mechanism comprising a comparator 34, the output of which is connected to a driver 35. The output of the conversion means 39, which may be a shaft 39' rotation, is fed to a correction factor means 36 which may be a multiplier set according to the system parameters. The output F2 of the correction factor means 36, is fed through a switch 37 to multiplying computer 16. The other input to the multiplying computer 16 is the input F1 which is the basic multiplier factor derived from the system parameters which may be manually set into system factor input means 38 by knob 38'.

The air temperature and part temperature sensors are thermistors, the part temperature thermistor being taped onto the part. The barometric sensor may be a bellows type device which is activated by pressure which in turn activates a potentiometer through a linkage.

The humidity correction is not too critical and may be made by a manual setting on a potentiometer 23. Switch 36' is preferably provided to permit manual setting.

Computation of environmental correction factor

Reference: 68° F.

Formula: (Automatically solved by environmental computer)

To find multiplication factor, correction for known environmental conditions.

$$F2 = F1[(1 - .357 \times 10^{-6}(P - 760) + .517 \times 10^{-6}(t - 68) + (H - .5) \times 10^{-6} - C(t - 68)]$$

Where:

$F2$ = New multiplication factor
$F1$ = Basic multiplication factor for system parameters
$P$ = Pressure in mm. of mercury
$t$ = Temperature in degrees F.
$H$ = Humidity (in fractions)
$C$ = Coefficient of expansion of part being measured (parts per million)

Example:

$F1 = 6.228542$ (for X1, reading in microinches)
$P = 800$ mm.
$t = 72°$ F.
$H = .7$ (70%)
$C = 6.5 \times 10^{-6}$ $$F2 = 6.228542(1 - .357 \times 10^{-6}(40) + .517 \times 10^{-6}(4) + (.2 \times 10^{-6}) - 6.5 \times 10^{-6}(4)$$
$$F2 = 6.228542(1 - 14.28 \times 10^{-6} + 2.068 \times 10^{-6} + .2 \times 10^{-6} - 26 \times 10^{-6})$$
$$F2 = 6.228542(.999961988)$$
$$F2 = 6.228305$$

The laser source may be a helium-neon gas laser. The laser source provides a coherent beam of radiation at the wavelength of 6329.91±.01 A. in vacuum. The optical components included in the sensor head are welded on glass surfaces and require no adjustment. This unit offers a high dimensional stability and is unaffected by aging or humidity.

The reflector B is preferably a tetrahedral prism, sometimes referred to as the "corner cube." It is fabricated with a beam precision of two seconds of an arc with its back surface optically flat to $\frac{1}{20}$ wavelength and front surface flat to $\frac{1}{10}$ wavelength. The front surface of the corner cube should be kept clean.

The corner reflector can be replaced by a mirror, to realize a single beam interferometer. This mirror should be a minimum of ⅜ inch diameter. In addition, the ways of the slide must be of high precision to assure that the mirror is maintained within 8 seconds (±4 seconds). The mirror must be flat to $\frac{1}{15}$ of a wave or better to realize full sensitivity and range of the equipment.

The fringe display is a fringe count determined by the reversible counting of cycles sensed by the photodetectors. Each electrical signal represents one fringe, which is one quarter of a wavelength. The combination of the signals of the detectors results in signals which are 90 degrees out-of-phase. Consequently, 4 pulses (90 degrees out-of-phase to each other) can be realized providing 4 counts per each input cycle.

The system preferably contains provisions for selection of one of the following sensitivities: (considering double beam interferometer)

X1—One pulse per cycle, where each count=1 fringe
  =¼ wave=6 microinch (approximately)
X2—Two pulses per cycle, where each count=½ fringe
  =⅛ wave=3 microinch (approximately)

X4—Four pulses per cycle, where each count=¼ fringe =1/16 wave=1.5 microinch (approximately)

In normal operation, the coarse setting of X1 (6 microinch least count) is adequate. However, in many instances, it may be desirable to increase the sensitivity to X2 and X4. The higher sensitivity (X4) will provide 4 counts per fringe.

The counter is capable of counting the pulses described above at repetition frequencies from 0 to 2 megacycles. The input circuits of the counter are capable of 500 kc. response.

The multiplying computer is preferably provided with a pulse input making it possible to read on the fly. A remote pulse may be introduced from control 20' to store the instantaneous fringe count in a buffer storage 20. After computer correction, the fringe count is displayed on the inch or metric readout 19. The inch readout is independent of the fringe readout and no errors are introduced by the buffer storage operation.

Inch computer function D description.—The inch computer D is a conventional unit whereby a constant multiplier is used to convert the lightwave readout to inches. An example is given where the number of fringes is counted is $n$, and the factor is $f$, then the distance being measured is $n \times f$.

Under standard conditions of pressure and temperature, the multiplying factor is 6.228542 microinches per each fringe. When the fringe is subdivided by 2, then the multiplier is 3.114271 microinches per pulse. Further subdivision of each fringe by 4, results in each pulse representing 1.557135 microinches. Insertion of the multiplying factor may be achieved by manually setting control switches 38.

In normal operation, the operator simply determines if he is interested in a higher sensitivity than 6 millionths of an inch. If he is not interested in higher sensitivity, then he sets the sensitivity selector switch 14a to X1 and the multiplying factor on switch 38 to 6.228542. The output will automatically read out in inches.

If the operator is interested in higher sensitivity, then he simply sets the sensitivity selector for instance, to X4 and sets his multiplier to 1.557135.

When the correction computer is used in conjunction with the system, the multiplication factor must be altered slightly. This is explained as follows.

The automatic correction computer, under normal environmental conditions will add 50 parts per million to the basic multiplying factor. We must, therefore, set the multiplying factor switch 50 parts per million lower than the basic value. The reason for this is that the total correction supplied is 100 parts per million (which is desirable to be set as ±50 parts per million from standard conditions).

Example:

Basic multiplying factor to change fringes to microinches=6.2285416.

Factor added by computer under normal conditions=

$$\frac{50}{1,000,000} \times 6.2285416 = .0003114$$

Actual factor set by operation=$\frac{\begin{array}{r}6.2285416\\ .0003114\end{array}}{6.2282302}$ The inch readout computer includes storage for the fringe readout from the bi-direction counter. The storage is initiated by a variable repetition rate multivibrator internally or from a remote input pulse.

Multiplication Factor.—A seven decade thumb switch 38 is provided, each switch numbering 0 to 10. This number can be set anywhere from 0.000000 to 9.999999. The fringe count is multiplied by this factor and the resultant is displayed on the inch or micron readout. The basic multiplication factor is the number used to convert fringes to inches or microns.

The multiplication factor to convert fringes to microns is derived as follows:

Laser wavelength (meters)=$4 \times 10^{-6}$ (meters)

$$\frac{632.81983 \times 10^{-9}}{4 \times 10^{-6}} = .1582049575 \text{ (microns)}$$

To convert fringes to inches:

Laser wavelength (meters)=$4 \times 10^{-6}$ ($2.54 \times 10^{-2}$)

$$\frac{632.81983 \times 10^{-9}}{10.16 \times 10^{-8}} = 6.22854163 \text{ inches}$$

Correction Factor.—In addition to the multiplying factor, a variable correction factor is in effect added to the multiplier by thumb-wheel switch 38 by the automatic correction computer. This correction factor may vary between 0 and 100 p.p.m. depending upon the instantaneous environmental conditions.

Under normal environmental conditions, the computer will add 50 p.p.m. (parts per million) correction. The minimum amount of correction is 0 p.p.m. and maximum is 100 p.p.m. For this reason, it is essential that the basic multiplying factor to convert fringes to inches or microns be altered when the correction computer is used. Fifty (50) p.p.m.'s must be subtracted from the basic multiplication factor.

Figure 2:
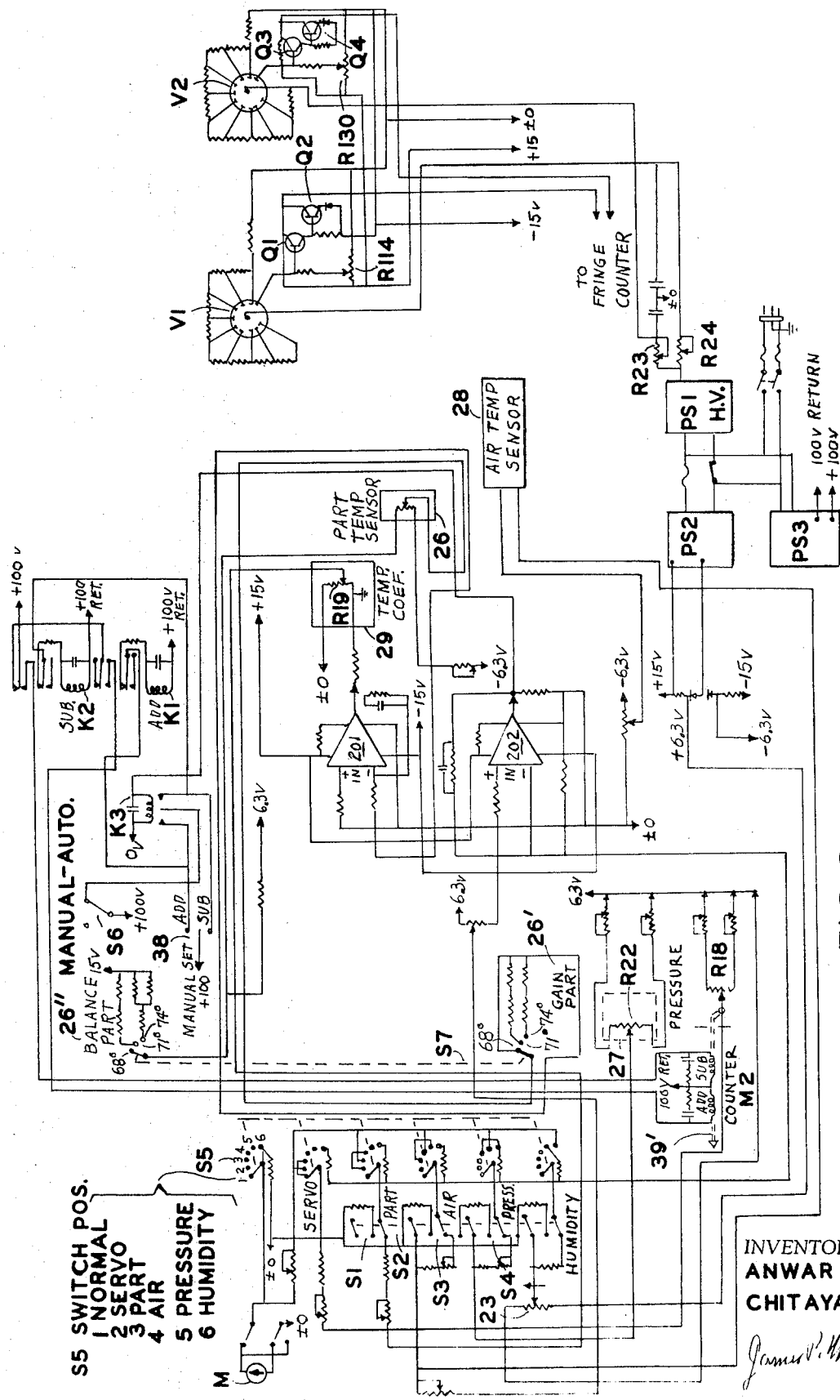
FIG. 2 is a schematic diagram of the embodiment of the invention.

Referring to FIG. 2, the environmental correction computer E provides the previously discussed continuous correction factors for changes in ambient conditions. This computer accepts sensor inputs as shown in FIG. 2, and provides a correction factor for the changes. This correction factor is applied to the inch or metric display by means of the multiplying computer 16. Each sensor can be switched in or out of the system as desired by switches S1 through S4. The correction factor being applied by each sensor can preferably be observed on a readout if desired and checked against actual ambient conditions. The total observed correction factors can then be applied using an office calculating machine, to the fringe count as displayed, to check against the inch or metric readout to verify computer accuracy. This again emphasizes the importance of the fringe count display as the basic reference in proving system accuracy.

All of the environmental sensor elements preferably have independent monitoring positions on meter M with the switch S5. The algebraic sum of the individual transducers can be read directly on the "servo" position of switch S5. This reading, which is a totalized reading, should be made during a period when the servo correction is at equilibrium, not during period when the individual transducers is changing, and when the correction toggle switch S6 is switched from "auto" to "manual." Following a check, the correction switch S6 must be turned back to "auto" position.

The output of the automatic environmental correction computer is an automatic switch which in effect adds a number from 0 to 100, to the multiplier thumb-wheel switch 38 FIG. 1.

The automatic environmental correction computer applies environmental correction factors to the computer at a rate of over 30 times a second so that basic readout is always compensated for ambient conditions existing at the moment. The computer accepts continuous inputs for:

(1) Percent relative humidity.
(2) Part temperature (coefficient of thermal expansion of the item being measured is dialed).
(3) Barometric pressure.
(4) Ambient temperature effecting index of refraction of air.

Percent humidity is manually set on potentiometer 23. Since the parts/million correction from 0% to 100% humidity applies a total of one part/million correction to the computer, it is unnecessary to incorporate automatic compensation. A dialed in setting from a hygrometer reading even grossly set will contribute negligible error. The percent humidity control is located on the front panel.

Part coefficient of thermal expansion is dialed in on the potentiometer 29 according to a predetermined number related to the particular material under investigation i.e., steel has a coefficient of expansion of 6.4 p.p.m. (parts per million). The part temperature sensing element 26 itself is placed against the material being measured.

The sensor 26 automatically measures the deviation in degrees Fahrenheit from the standard 68 degrees calibration. For example, if the part itself is at a temperature of 72 degrees F., this indicates a deviation from standard of 4 degrees F. The correction to the computer in parts/million is then 4×6.4 or 25.6 parts/million. This correction can be read on front panel meter M1 by switching to "part" position of switch S5. Note, that the meter will read a minus 25.4 parts/million correction since increase in temperature from the standard 68 degrees F. to 72 degrees F. means the material has "grown." Consequently, this indicates that the correction factor has a negative coefficient if we are to read correctly the actual length of the material at the standard 68 degrees F. Conversely, the correction coefficient must have a positive value if the actual part temperature during measurement is below the standard 68 degrees F. The significant point here is that the parts correction into the computer, as well as air and pressure correction, is related back to a standard laboratory controlled environment even when the system is used in a "shop" environment.

Switch S7 adjusts the part temperature adjustment bridge for different temperature levels i.e. 68°, 71°, and 74°. Switch 38 is a decade switch means to manually set in the factor F1, FIG. 1.

Barometric pressure transducer 27 is preferably physically located on top of the equipment chassis. The standard calibration of zero correction is at 760 mm. Hg. The coefficient is positive (+) at lower pressure and negative (−) at higher pressure.

Air temperature transducer 28 standard condition is 68 degrees F. for zero correction. The coefficient of correction is positive (+) above 68 degrees F. and negative (−) below 68 degrees F. The sensor element should be placed close to the center of the optical air path of the moving corner cube.

The high voltage power is supplied by power supply PS1. Two independent high voltage adjustment controls R23 and R24 are provided. In addition, there is a main control for coarse voltage adjustment to vary simultaneously the high voltage of both photomultiplier tubes.

The photomultiplier circuitry in the sensor head is illustrated on the right hand side of FIG. 2. V1 and V2 are the photomultipliers. Q1 and Q2, Q3 and Q4 are Darlington circuits for matching the high impedance output of the photomultipliers to the output cables. The D.C. biases of the output signals are adjusted by R114 and R130. High voltage is supplied to the photomultipliers by PS1. Individual adjustment of the two voltages is obtained by means of R23 and 24. PS-2 supplies stable regulated voltages at +15 and −15 volts to the correction computer and Darlington circuits. PS-3 supplies 100 volts to the stepping counter M2.

The operational amplifier components are shown in the center of the schematic FIG. 2. They consist of two operational amplifiers 201 and 202 together with appropriate resistors. Amplifier 201 is driven by the part temperature sensing thermistor probe bridge 26, 26', 26". The amplifier output 201 is applied to one end of the parts temperature coefficient potentiometer R19, so that the output from the tap of R19 is a voltage proportional to the temperature multiplied by the coefficient of thermal expansion of the part. This voltage is fed in turn through switch S1 and switch S5 summing circuit and to the input of amplifier 202 which generates a signal proportional to the sum of all the corrections.

Air temperature is monitored by a different thermistor probe, together with the proper bridge resistors. Barometric pressure is determined by transducer R22 whose output is also fed through one of the summing resistors to amplifier 202. Humidity is not measured since the total range of correction is extremely small. Instead, a manual potentiometer 23 is used for setting this correction to the estimated or measured relative humidity.

When switch S5 is set to the normal position all the correction signals are fed through their summing resistors to the negative input of amplifier 202. The output signal from this amplifier operates relay K3 to driven stepping counter M2 in the proper direction. Stepping is accomplished by relays K1 and K2 which generate step pulses of the proper spacing. This operation takes place only when S6 is set on the "auto" position. As counter M2 is stepped it drives output shaft 39' and feedback potentiometer R18 which supplies a voltage proportional to the position of the tap. This voltage is fed back through a summing resistor to the input of amplifier 202. In this way, counter M2 is stepped until the output voltage of R18 just counteracts the voltage due to the sum of the corrections.

Many modifications may be made by those who desire to practice the invention without departing from the scope thereof which is defined by the following claims.

I claim:

1. In an interferometer of the type having fringe counter output means,
multiplication means connected to said output of said fringe counter means,
and environmental correction computer means connected to modify said multiplication means.

2. Apparatus as in claim 1 wherein said environmental correction computer means comprises air temperature sensing means.

3. Apparatus as in claim 2 wherein said correction means comprises a barometric pressure sensing means.

4. Apparatus as in claim 3 wherein said correction computer includes part temperature sensing means.

5. Apparatus as in claim 1 wherein said environmental correction computer means comprises,
part temperature responsive sensing means,
barometric pressure sensing means,
air temperature sensing means,
and operational amplifier means to combine the outputs of said sensing means to provide a correction factor to said output means.

6. Apparatus as in claim 5 wherein said correction computer means includes a humidity responsive means.

7. Apparatus as in claim 6 wherein said part temperature responsive means includes means to insert the coefficient of temperature expansion for different metals.

8. Apparatus as in claim 1 wherein said correction computer means includes manual input means.

9. Apparatus as in claim 3 wherein said correction computer means has an operational amplifier wherein the correction factors are weighted and summed.

10. Apparatus as in claim 3 wherein the correction factors from said sensing means are switchable and monitorable.

11. Apparatus as in claim 3 wherein the correction factors from said sensing means are combined in analog form.

12. Apparatus as in claim 9 wherein the summed corrections are converted to digital form.

13. Apparatus as in claim 3 wherein the interferometer includes means to store and display the total count at any particular instant of time without interrupting the continuous counting.

14. Environmental correction computer means comprising,
part temperature responsive sensing means,
barometric pressure sensing means,
air temperature sensing means, and means to combine the outputs of said sensing means.

15. An interferometer having output readout means, environmental correction computer means connected to said output means comprising,
part temperature responsive sensing means,
barometric pressure sensing means,
air temperature sensing means,
operational amplifier means to combine the outputs of said sensing means,
and means to connect said combined output of said sensing means to modify said output readout means.

16. Apparatus as in claim 15 wherein said output readout means is a fringe counter.

References Cited

"Interferometric Calibration of Precision Screws and Control of Ruling Engines," Harrison et al., IOSA vol. 41, No. 8, pp. 495–503.

"Length-Measuring Interferometer," Corey et al., Report No. Y–1466; Union Carbide Corporation; pp. 11 and 12, June 19, 1964.

"Laser Interferometer," London, Fred H., Instruments and Control Systems; pp. 87–89; November 1964.

"Three Interferometry Systems for Precision Measurements," Laser Focus, Jan. 1, 1966, vol. 2, No. 1, pp. 14–17.

RONALD L. WIBERT, Primary Examiner

V. P. McGRAW, Assistant Examiner

U.S. Cl. X.R.

356—256